United States Patent
Sato et al.

(10) Patent No.: US 10,345,807 B2
(45) Date of Patent: Jul. 9, 2019

(54) CONTROL SYSTEM FOR AND CONTROL METHOD OF AUTONOMOUS DRIVING VEHICLE

(71) Applicant: Toyota Jidosha Kabushiki Kaisha, Toyota-shi, Aichi-ken (JP)

(72) Inventors: Jun Sato, Susono (JP); Yuma Kawamori, Susono (JP); Keiko Tosaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/686,850

(22) Filed: Aug. 25, 2017

(65) Prior Publication Data

US 2018/0059662 A1    Mar. 1, 2018

(30) Foreign Application Priority Data

Aug. 26, 2016    (JP) .................................. 2016-165869

(51) Int. Cl.
   *G05D 1/00*    (2006.01)
   *B60K 35/00*    (2006.01)

(52) U.S. Cl.
   CPC ........... *G05D 1/0061* (2013.01); *B60K 35/00* (2013.01); *B60K 2350/1056* (2013.01); *B60K 2350/1096* (2013.01); *G05D 2201/0213* (2013.01)

(58) Field of Classification Search
   CPC ......... G05D 1/0061; G05D 2201/0213; B60K 35/00; B60K 2350/1056; B60K 2350/1096

USPC .......................................................... 701/23
   See application file for complete search history.

(56) References Cited

U.S. PATENT DOCUMENTS

| 5,774,069 A | * | 6/1998 | Tanaka | ...................... | B60T 7/12 |
| | | | | | 180/167 |
| 6,957,128 B1 | | 10/2005 | Ito et al. | | |
| 8,509,982 B2 | * | 8/2013 | Montemerlo | ........... | G06T 7/223 |
| | | | | | 701/26 |
| 8,670,891 B1 | | 3/2014 | Szybalski et al. | | |
| 8,825,264 B2 | | 9/2014 | Montemerlo et al. | | |
| 2017/0203770 A1 | | 7/2017 | Kondo | | |
| 2018/0022356 A1 | * | 1/2018 | McBride | .................. | B60Q 9/00 |
| | | | | | 340/439 |

FOREIGN PATENT DOCUMENTS

| JP | H09161196 A | 6/1997 |
| JP | 2001143191 A | 5/2001 |
| JP | 4019865 B2 | 12/2007 |

(Continued)

*Primary Examiner* — Muhammad Shafi
(74) *Attorney, Agent, or Firm* — Dinsmore & Shohl LLP

(57) ABSTRACT

A control system for an autonomous driving vehicle is provided with an information provision device 10 configured to provide a driver with information and an operation request part configured to control the information provision device to provide the driver with information during autonomous driving to thereby request a predetermined operation to the driver. The operation request part is provided with a margin time calculation part configured to calculate a margin time until a timing at which the driver should start the operation when the operation should be requested to the driver and an information provision control part configured to provide the driver with information differing according to the margin time.

13 Claims, 3 Drawing Sheets

(56) References Cited

FOREIGN PATENT DOCUMENTS

| | | | |
|---|---|---|---|
| JP | 2013544695 | A | 12/2013 |
| JP | 2016028927 | A | 3/2016 |
| WO | 2012047743 | A2 | 4/2012 |

* cited by examiner ic control unit (ECU) 20.

CONTROL SYSTEM FOR AND CONTROL METHOD OF AUTONOMOUS DRIVING VEHICLE

CROSS-REFERENCE TO RELATED APPLICATIONS

This application claims priority to Japanese Patent Application No. 2016-165869 filed Aug. 26, 2016, the entire disclosure of which is incorporated by reference herein.

BACKGROUND

1. Technical Field

The present disclosure relates to a control system for and control method of an autonomous driving vehicle.

2. Related Art

An autonomous driving vehicle is known in the art, which notifies a driver if the vehicle approaches an area where autonomous driving may be difficult (for example, see Japanese Patent Publication No. 2013-544695A). In one example, the vehicle requests control of steering, acceleration, deceleration, etc., to the driver using voice, flashing lights, a beeping sound, vibration, etc.

SUMMARY

However, when the control such as steering, etc., should be requested to the driver, if a margin time until a timing at which the driver should start this control is short, compared with if the margin time is long, the driver has to quickly understand matters requested to the driver. Japanese Patent Publication No. 2013-544695A mentioned above does not consider this point at all.

According to one embodiment of the present disclosure, there is provided a control system for an autonomous driving vehicle, comprising: an information provision device configured to provide a driver with information; and an operation request part configured to control the information provision device to provide the driver with information during autonomous driving to thereby request a predetermined operation to the driver, wherein the operation request part comprises: a margin time calculation part configured to calculate a margin time until a timing at which the driver should start the operation when the operation should be requested to the driver; and an information provision control part configured to provide the driver with information differing according to the margin time.

According to another embodiment of the present disclosure, there is provided a control method of an autonomous driving vehicle comprising an information provision device configured to provide a driver with information, the control method including an operation request step of controlling the information provision device to provide the driver with information during autonomous driving to thereby request a predetermined operation to the driver, the operation request step including: a margin time calculation step of calculating a margin time until a timing at which the driver should start the operation when the operation should be requested to the driver; and an information provision control step of providing the driver with information differing according to the margin time.

The present disclosure may be more fully understood from the description of the embodiments according to the present disclosure as set forth below, together with the accompanying drawings.

DESCRIPTION OF THE EMBODIMENTS

Figure 1:
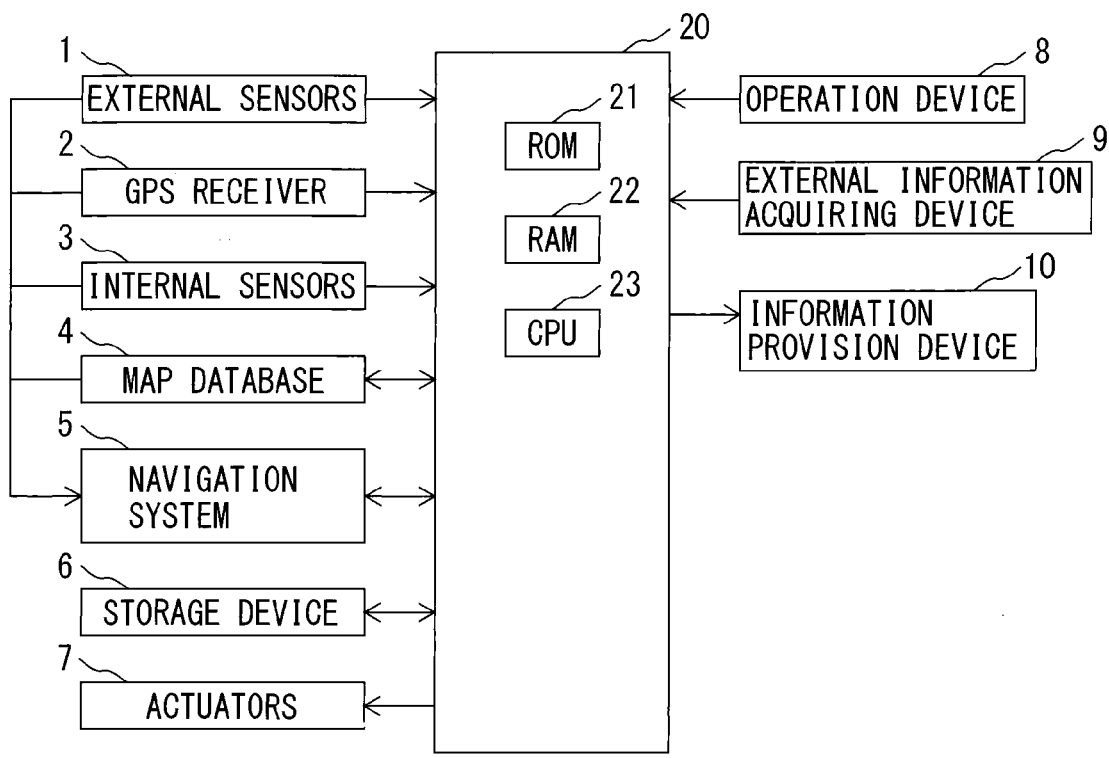
FIG. 1 is a block diagram of a control system for an autonomous driving vehicle of an embodiment according to the present disclosure.

FIG. 1 is a block diagram of a control system for an autonomous driving vehicle of an embodiment according to the present disclosure. Referring to FIG. 1, the control system for an autonomous driving vehicle of the embodiment according to the present disclosure is provided with an external sensor 1, GPS receiver 2, internal sensor 3, map database 4, navigation system 5, storage device 6, various actuators 7, operation device 8, external information acquiring device 9, information provision device 10, and electronic control unit (ECU) 20.

Figure 2:
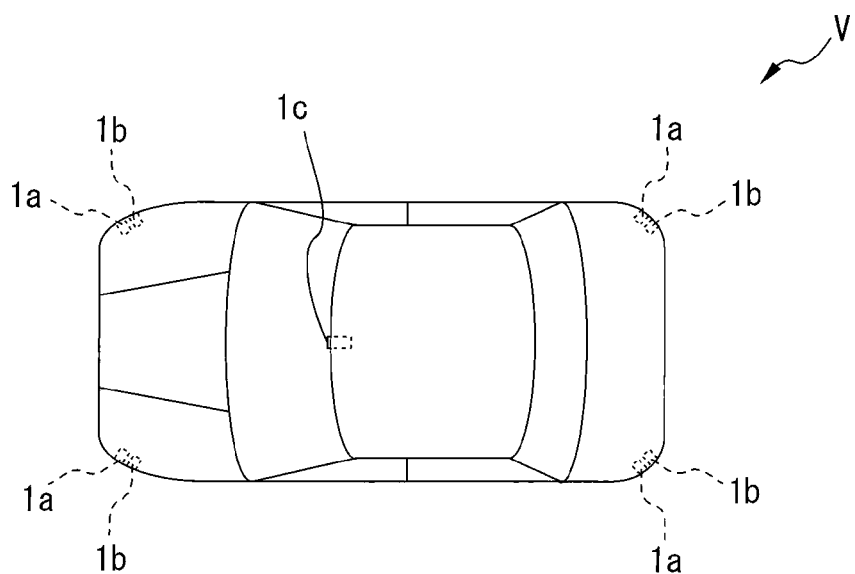
FIG. 2 is a schematic view for explaining an external sensor of an embodiment according to the present disclosure.

The external sensor 1 is configured to detect information at an outside or surroundings of a host vehicle. The external sensor 1 is provided with at least one of a LIDAR (Laser Imaging Detection and Ranging), radar, and camera. In the embodiment according to the present disclosure, as shown in FIG. 2, the external sensor 1 is provided with LIDARs 1a, radars 1b, and camera 1c.

The LIDAR 1a is a device for detecting a road over which the host vehicle is running or outside obstacles, using laser beams. In the example shown in FIG. 2, four LIDARs 1a are respectively attached to bumpers at four corners of the vehicle V. The LIDARs 1a successively fire laser beams toward the surroundings of the host vehicle V and measure distances to the road and obstacles around the road from reflected light to detect the road and obstacles around the host vehicle V in the form of a 3D image. The 3D image of the road and obstacles detected by the LIDARs 1a is transmitted to the electronic control unit 20. On the other hand, the radar 1b is a device for detecting obstacles outside the host vehicle V, using electromagnetic waves. In the example shown in FIG. 2, four radars 1b are attached to the bumpers at the four corners of the vehicle V. The radars 1b emit electromagnetic waves from the radars 1b to the surroundings of the host vehicle V and measures distances to the obstacles in the surroundings of the host vehicle V from reflected waves. The obstacle information detected by the radars 1b is sent to the electronic control unit 20. The camera 1c, in the example shown in FIG. 2, is provided with a front camera provided at an inside of a front glass of the vehicle V. The front camera 1c captures a color or monochrome image of the front of the host vehicle V. The color or monochrome image information obtained by the front camera 1c is transmitted to the electronic control unit 20.

The GPS receiver 2 is configured to receive signals from three or more GPS satellites to thereby detect an absolute position of the host vehicle V (for example, the latitude and longitude of the host vehicle V). The absolute position information of the host vehicle V detected by the GPS receiver 2 is transmitted to the electronic control unit 20.

The internal sensor 3 is configured to detect running condition of the vehicle V. The running condition of the host vehicle V is expressed by at least one of speed, acceleration, and posture of the host vehicle. The internal sensor 3 is provided with one or both of a vehicle speed sensor and IMU (inertial measurement unit). In the embodiment according to the present disclosure, the internal sensor 3 is provided with a vehicle speed sensor and IMU. The vehicle speed sensor detects a speed of the host vehicle V. The IMU is provided with, for example, a three-axis gyro and a 3-direction acceleration sensor, detects a 3D angular speed and acceleration of the host vehicle V, and detects the acceleration and posture of the vehicle V based on these. The running condition information of the vehicle V detected by the internal sensor 3 is transmitted to the electronic control unit 20.

The map database 4 is a database relating to map information. This map database 4 is stored in, for example, an HDD (hard disk drive) mounted in the vehicle. The map information includes, for example, position information of roads, information on road shapes (for example, road width, curved or straight, curvature of curves, positions of intersections, merging points, and branching points etc.), and positions and shapes of buildings.

The navigation system 5 is configured to guide the host vehicle V to a destination input by the driver of the host vehicle V to the navigation system 5. This navigation system 5 calculates a target route up to the destination based on the current position information of the host vehicle V detected by the GPS receiver 2 and the map information of the map database 4. The information of the target route of the host vehicle V is transmitted to the electronic control unit 20.

The storage device 6 stores a road map specially designed for autonomous driving prepared based on the 3D images of obstacles detected by the LIDARs 1a and the results of detection by the LIDARs 1a. The 3D images of the obstacles and road map are constantly or periodically updated.

The actuators 7 are devices for controlling running operations of the host vehicle V in accordance with control signals from the electronic control unit 20. The running operations of the vehicle V include powering, braking, and steering of the vehicle V. The actuators 7 include at least one of a powering actuator, braking actuator, and steering actuator. In the embodiment according to the present disclosure, the actuators 7 include a powering actuator, braking actuator, and steering actuator. The powering actuator controls an output of an engine or electric motor providing drive power of the vehicle V and thereby controls a powering operation of the vehicle V. The braking actuator operates a braking system of the vehicle V and thereby controls a braking operation of the vehicle V. The steering actuator operates a steering system of the vehicle V and thereby controls a steering operation of the vehicle V.

The operation device 8 is configured to be operated by the driver of the vehicle. The operation device 8 is provided with, for example, at least one of a control button, switch, lever, touch panel, voice recognition device (microphone), steering wheel, accelerator pedal, and brake pedal. In the example shown in FIG. 3, the operation device 8 is provided with an operating button 8a. Further, in the example shown in FIG. 3, the operating button 8a is arranged on the steering wheel STR. A signal indicating that the operation device 8 has been operated is sent to the electronic control unit 20.

The external information acquiring device 9 is configured to acquire external information of the vehicle V. The external information includes at least one of weather information (for example, any of a clear, cloudy, rain, fog, or snow or an amount of rainfall, amount of snowfall, degree of fog, wind speed, etc.) and traffic information (for example, existence of any traffic accidents, degree of congestion, etc.) In the embodiment according to the present disclosure, the external information acquiring device 9 is provided with, for example, an information receiving device and receives weather information, traffic information, etc. sent from outside the vehicle. The external information acquired by the external information acquiring device 9 is transmitted to the electronic control unit 20.

Figure 3:
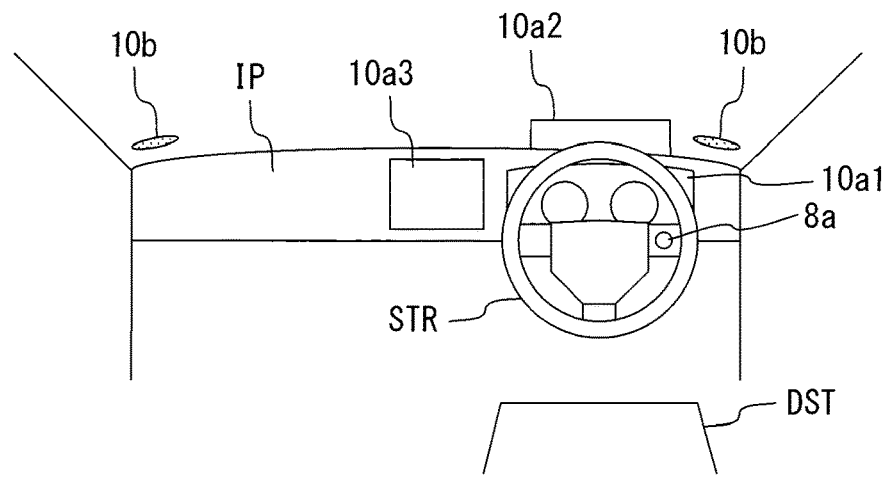
FIG. 3 is a view showing a passenger cabin of an embodiment according to the present disclosure.

The information provision device 10 is configured to provide the driver with information. This information includes, for example, at least one of text information, image information, voice information, etc. In a case where the information is text information or image information, the information provision device 10 is provided with a display which the driver can view. The display includes, for example, a meter display 10a1 provided at an instrument panel IP behind a steering wheel STR, a heads up display 10a2 provided at the instrument panel IP above the meter display 10a1, a center display 10a3 provided at the instrument panel IP at the substantial center in a vehicle width direction, etc., as shown in FIG. 3. The meter display 10a1 displays, for example, a vehicle speed, engine speed, remaining fuel amount, remaining battery power, etc. The center display 10a3 is used for the navigation system 5 to display the target route and display guidance to the destination ("Turn left at the next intersection." etc.) In this case, the information provision device 10 displays text information or image information on the display to provide the driver with information.

On the other hand, in a case where the information is voice information, the information provision device 10 is provided with, for example, speakers. The speaker includes, for example, a pair of speakers 10b provided at a top part of the instrument panel IP, as shown in FIG. 3. In this case, the information provision device 10 emits voice information from the speakers to provide the driver with information.

In the embodiment according to the present disclosure, the information provision device 10 is provided with at least one of the meter display 10a1, heads-up display 10a2, center display 10a3, and speakers 10b. The information provision device 10 is controlled based on a control signal from the electronic control unit 20.

Figure 4:
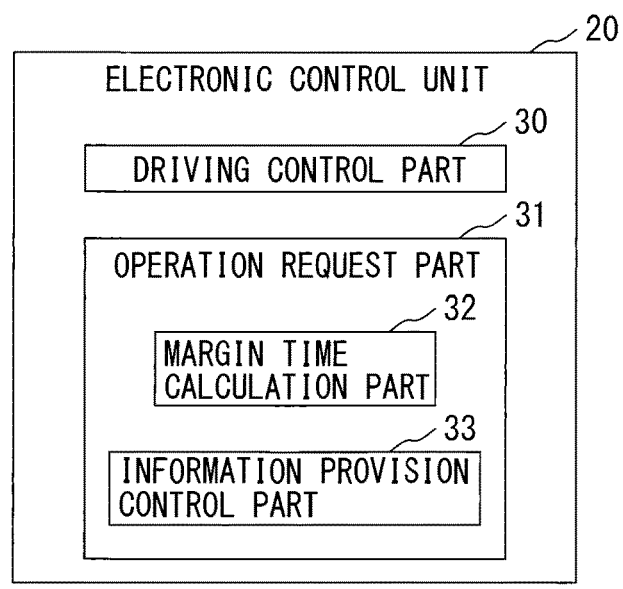
FIG. 4 is a block diagram of an electronic control unit of an embodiment according to the present disclosure.

Referring again to FIG. 1, the electronic control unit 20 is a computer provided with components connected with each other by a bidirectional bus such as a ROM (read only memory) 21, RAM (random access memory) 22, CPU (central processing unit) 23, etc. The ROM 21 and RAM 22 are also called "storage parts". In the embodiment according to the present disclosure, as shown in FIG. 4, the electronic control unit 20 is provided with a driving control part 30 and an operation request part 31. In the embodiment according to the present disclosure, the operation request part 31 is provided with a margin time calculation part 32 and information provision control part 33. The driving control part 30, operation request part 31, margin time calculation part 32, and information provision control part 33 will be explained later.

In the embodiment according to the present disclosure, the driving control part 30 judges during manual driving if autonomous driving is possible. For example, if the vehicle V is in an area appropriate for autonomous driving and an external state of the vehicle V can be reliably detected by the external sensor 1, it is judged that autonomous driving is possible. As opposed to this, if the vehicle V is in an area inappropriate for autonomous driving or the external state of the vehicle V cannot be reliably detected by the external sensor 1, it is not judged that autonomous driving is possible. If the driving control part 30 judges that autonomous driving is possible, the driving control part 30 controls the notification device 10 to notify the driver that autonomous driving is possible. Next, if the driver operates the operation device 8, the driving control part 30 starts autonomous driving. That is, running operations of the vehicle V, that is, powering, braking, and steering, are controlled by the actuators 7. On the other hand, if the driver operates the operation device 8 during-autonomous driving, the driving control part 30 terminates autonomous driving and switches the vehicle driving from autonomous driving to manual driving. In this case, the running operations of the vehicle V, that is, the powering, braking, and steering, are performed by the driver.

Note that, in a case where the operation device 8 is provided with the operating button 8a, an operation for terminating autonomous driving is a pushing down of the operating button 8a by the driver during autonomous driving. Alternatively, in a case where the operation device 8 is provided with the steering wheel, the operation for terminating autonomous driving is an operation of the steering wheel by the driver by a predetermined threshold amount or more during autonomous driving. In a case where the operation device 8 is provided with the accelerator pedal, the operation for terminating autonomous driving is a depression of the accelerator pedal by the driver by a predetermined threshold amount or more during autonomous driving. In a case where the operation device 8 is provided with the brake pedal, the operation for terminating autonomous driving is a depression of the brake pedal by the driver by a predetermined threshold amount or more during autonomous driving.

On the other hand, the operation request part 31 is configured to control the information provision device 10 to provide information to the driver during autonomous driving to thereby request a predetermined operation to the driver. In the embodiment according to the present disclosure, this operation includes at least one of an operation for terminating autonomous driving and an operation for establishing conditions for preparing for manual driving.

In the embodiment according to the present disclosure, if it is judged during autonomous driving that continuation of autonomous driving would be difficult, operation for terminating autonomous driving is requested to the driver. That is, the driver is requested to operate the operation device 8 so as to terminate the autonomous driving.

Further, in the embodiment according to the present disclosure, if it is judged during autonomous driving that there is a high possibility of continuation of autonomous driving being difficult, an operation for establishing conditions for preparing for manual driving is requested. The conditions for preparing for manual driving include at least a hands-on condition. The hands-on condition includes, for example, a condition of the driver placing his or her hand(s) on the steering wheel STR, a condition of the driver gripping the steering wheel STR, etc. In another embodiment (not shown), the conditions for preparing for manual driving include, in addition to the hands-on condition, a condition of the driver placing his or her foot on the brake pedal, a condition in which the gaze of the driver is directed to the front of the vehicle, etc.

The judgment of whether continuation of autonomous driving would be difficult and the judgment of whether there is a high possibility of continuation of autonomous driving being difficult are performed, for example, as follows. That is, during autonomous driving, the operation request part 31 repeatedly calculates an autonomous driving reliability value expressing a degree of reliability of autonomous driving. The autonomous driving reliability value expresses a degree of reliability of autonomous driving in the form of a numerical value. When the autonomous driving reliability value is small, the degree of reliability of autonomous driving is lower compared with when the autonomous driving reliability value is large. That is, continuation of autonomous driving is more difficult. Based on this, the operation request part 31 judges continuation of autonomous driving would be difficult if the autonomous driving reliability value is equal to or smaller than a predetermined termination request value, and does not judge continuation of autonomous driving would be difficult if the autonomous driving reliability value is larger than the termination request value. Alternatively, the operation request part 31 judges that there is a high possibility of continuation of autonomous driving being difficult if the autonomous driving reliability value is equal to or smaller than a preparation request value, which is set larger than the termination request value, and is larger than the termination request value, and does not judge that there is a high possibility of continuation of autonomous driving being difficult if the autonomous driving reliability value is larger than the preparation request value.

In this example, establishing of conditions for preparing for manual driving is requested to the driver before termination of autonomous driving is requested to the driver. If the driver is in a condition for preparing for manual driving when termination of autonomous driving is requested to the driver, the driver can quickly terminate autonomous driving, that is, start manual driving. Note that the request for preparing for manual driving does not request for terminating autonomous driving. That is, the driver can establish conditions for preparing for manual driving while continuing autonomous driving. Therefore, the driver is limited from feeling bothered.

The autonomous driving reliability value is calculated based on, for example, at least one of external information of the vehicle V (for example, weather information, traffic information, etc.) and precision of localization of the vehicle V. The external information of the vehicle V is obtained by the above-mentioned external information acquiring device 9. For example, when the weather is rain, fog, or snow, the autonomous driving reliability value is smaller compared with when the weather is clear or cloudy. Alternatively, in a region where a traffic accident has occurred, the autonomous driving reliability value is smaller compared with a region where no traffic accident has occurred. On the other hand, the precision of localization is calculated based on, for example, correlation between images obtained by the external sensor 1 such as the camera 1c and images stored in the map database 4. If the precision of localization is low, the autonomous driving reliability value is smaller compared with if the precision of localization is high.

Now, in the embodiment according to the present disclosure, as explained above, the operation request part 31 controls the information provision device 10 to provide the driver with information to thereby request an operation to the driver. In the embodiment according to the present disclosure, the information provided to the driver includes operation information and additional information.

The operation information is information on an operation requested to a driver. That is, if an operation for terminating autonomous driving is requested to the driver, the operation information is information on an operation for terminating autonomous driving. That is, in this case, as operation information, text information such as "Please terminate autonomous driving." or "Termination of autonomous driving." is displayed on at least one of the displays 10a1, 10a2, and 10a3 of the information provision device 10. Alternatively, still image information or moving image information illustrating an operation of a driver terminating autonomous driving is displayed on at least one of the displays 10a1, 10a2, and 10a3 of the information provision device 10. Alternatively, voice information such as "Please terminate autonomous driving." is emitted from the speakers 10b of the information provision device 10.

On the other hand, if an operation for establishing conditions for preparing for manual driving is requested to the driver, the operation information is information on an operation for establishing conditions for preparing for manual driving. That is, in this case, text information such as "Please establish conditions for preparing for manual driving.", "Please take hold of the steering wheel.", "Preparation for manual driving." is displayed at least at one of the displays 10a1, 10a2, and 10a3 of the information provision device 10. Alternatively, still image information or moving image information illustrating, for example, an operation of a driver establishing conditions for preparing for manual driving is displayed on at least one of the displays 10a1, 10a2, and 10a3 of the information provision device 10. Alternatively, voice information such as "Please establish conditions for preparing for manual driving." is emitted from the speakers 10b of the information provision device 10.

Note that, if at least two of text information, image information, and voice information are overlappingly provided to the driver by the information provision device 10, the driver can understand or recognize the information more reliably. Further, if, for example, at least one of turning on or flashing of a light, sounding of a buzzer, or vibration of the steering wheel or driver's seat DST is performed overlapping with the provision of information by the information provision device 10, more reliable understanding of the driver can be obtained.

On the other hand, the additional information is information different from operation information. In the embodiment according to the present disclosure, the additional information includes information on a cause of an operation being requested to the driver. That is, in a case where an operation for terminating autonomous driving is requested to the driver, the cause of the operation being requested is, for example, occurrence of a traffic accident, occurrence of congestion, deterioration of the weather, etc. Therefore, in a case where the cause in question is the occurrence of a traffic accident, text information or voice information such as "A traffic accident had occurred ahead, and thus autonomous driving cannot be continued." is provided as the additional information by the information provision device 10 to the driver. Similarly, in a case where an operation for establishing conditions for preparing for manual driving is requested to the driver, a cause of an operation being requested is, for example, occurrence of a traffic accident, occurrence of congestion, deterioration of the weather, etc. Therefore, in a case where the cause in question is the occurrence of a traffic accident, text information or voice information such as "A traffic accident had occurred ahead, and thus autonomous driving may not be able to be continued." is provided as additional information by the information provision device 10 to the driver.

Further, in the embodiment according to the present disclosure, the additional information includes information on a purpose of an operation being requested to the driver. That is, in a case where an operation for establishing conditions for preparing for manual driving is requested, one example of the purpose of the operation being requested would be to prepare for steering for avoidance. Therefore, in this case, as additional information, text information or voice information such as "In order to get ready for steering for avoidance, (please prepare for manual driving)" is provided as additional information by the information provision device 10 to the driver.

In this regard, in the embodiment according to the present disclosure, the operation request part 31, as explained above, is provided with a margin time calculation part 32 and information provision control part 33. The margin time calculation part 32 is configured to calculate a margin time until a timing at which the driver should start operation when the operation should be requested to the driver. On the other hand, the information provision control part 33 is configured to provide the driver with information differing according to the margin time.

If the margin time is relatively short, the driver has to quickly understand the operation requested. As opposed to this, if the margin time is relatively long, there is little need for the driver to quickly understand the requested operation. Rather, in some embodiments, the driver is provided with various information.

Therefore, in the embodiment according to the present disclosure, when an operation should be requested to the driver, the margin time is calculated and different information are provided to the driver according to the margin time.

Figure 5:
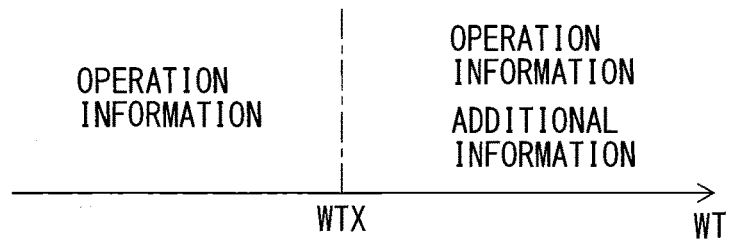
FIG. 5 is a schematic view explaining a relationship between a margin time and information provided to a driver.

Explained more specifically, in the embodiment according to the present disclosure, if the margin time WT is longer than a predetermined threshold time WTX, the above-mentioned operation information and additional information are provided to the driver, as shown in FIG. 5. As opposed to this, if the margin time WT is shorter than the threshold time WTX, only the operation information is provided to the driver without providing additional information.

That is, explaining as an example a case where an operation for establishing conditions for preparing for manual driving is requested to the driver, if WT>WTX, a combination of operation information and additional information such as "A traffic accident has occurred ahead, and thus autonomous driving may not be able to be continued. In order to get ready for steering for avoidance, please establish conditions for preparing for manual driving.", "A traffic accident has occurred ahead, and thus please establish conditions for preparing for manual driving.", "In order to get ready for steering for avoidance, please establish conditions for preparing for manual driving." is provided to the driver. As opposed to this, if WT<WTX, operation information such as "Please establish conditions for preparing for manual driving." is provided to the driver. In this case, additional information is not provided.

As a result, if the margin time is relatively short, the driver can quickly and accurately understand the requested operation. Further, if the margin time is relatively long, the driver can obtain various information. In this way, suitable information can be provided to the driver in accordance with a situation of the vehicle V.

Figure 6:
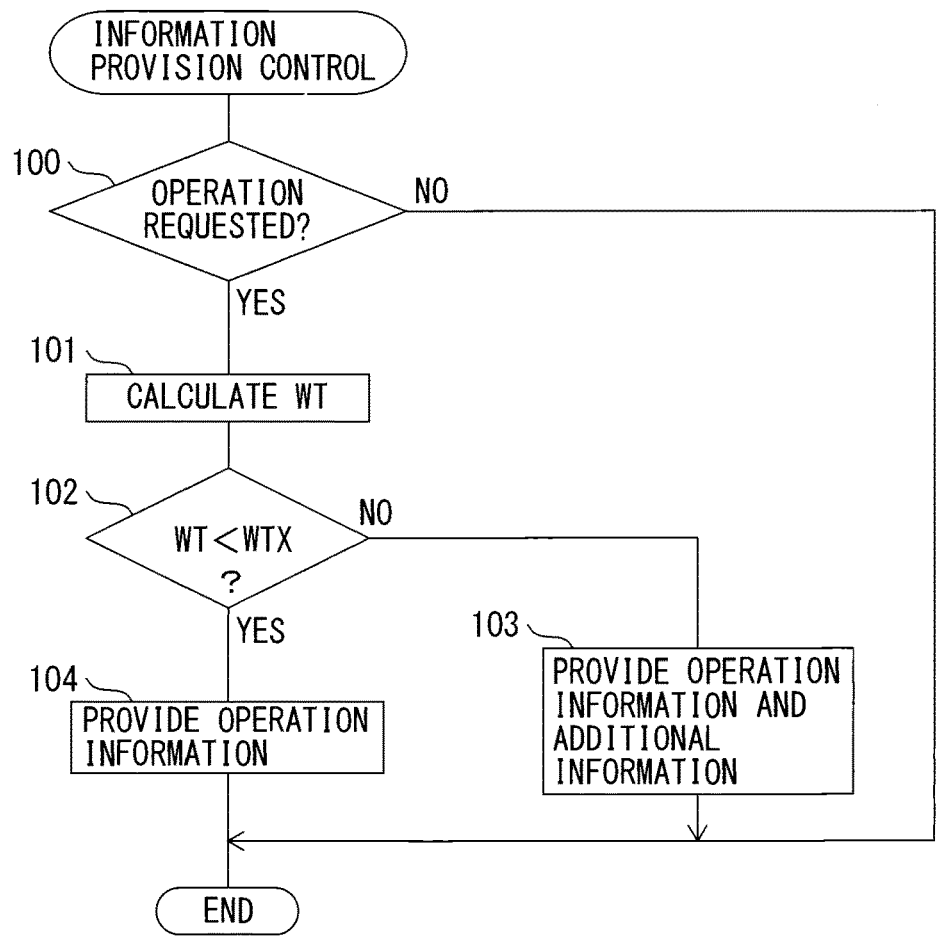
FIG. 6 is a flow chart showing an information provision control routine of an embodiment according to the present disclosure.

FIG. 6 shows a routine for performing the above-mentioned information provision control of the embodiment according to the present disclosure. This routine is performed by interruption every predetermined time period. Referring to FIG. 6, at step 100, it is judged if an operation should be requested to the driver. If the operation should not be requested to the driver, the processing cycle is ended. If the operation should be requested to the driver, next the routine proceeds to step 101 where the margin time WT is calculated. At the next step 102, it is judged if the margin time WT is shorter than the threshold time WTX. When WT≥WTX, next the routine proceeds to step 103 where operation information and additional information are provided to the driver by the information provision device 10. As opposed to this, if WT<WTX, next, the routine proceeds to step 104 where operation information is provided to the driver by the information provision device 10, without providing additional information to the driver.

Suitable information can be provided to a driver in accordance with the situation of the autonomous driving vehicle.

While the present disclosure has been described by reference to specific embodiments chosen for purposes of illustration, it should be apparent that numerous modifications could be made thereto, by those skilled in the art, without departing from the basic concept and scope of the present disclosure.

What is claimed is:

1. A control system for an autonomous driving vehicle, comprising:
    an information provision device configured to provide a driver with information; and
    an operation request part configured to control the information provision device to provide the driver with information during autonomous driving to thereby request a predetermined operation to the driver, wherein the operation request part comprises:
    a margin time calculation part configured to calculate a margin time until a timing at which the driver should start the operation when the operation should be requested to the driver; and
    an information provision control part configured to control the information provision device to:
        provide the driver with information differing according to the margin time to thereby request the predetermined operation to the driver,
        provide the driver with operation information which is information on the operation, and additional information different from the operation information when the margin time is longer than a predetermined threshold time, and
        provide the driver with the operation information without providing the driver with the additional information when the margin time is shorter than the threshold time.

2. The control system for an autonomous driving vehicle according to claim 1, wherein the operation includes an operation for terminating autonomous driving.

3. The control system for an autonomous driving vehicle according to claim 1, wherein the operation includes an operation for establishing conditions for preparing for manual driving.

4. The control system for an autonomous driving vehicle according to claim 1, wherein the additional information includes information on a cause of the operation request part requesting the operation to the driver.

5. The control system for an autonomous driving vehicle according to claim 1, wherein the additional information includes information on a purpose of the operation request part requesting the operation to the driver.

6. The control system for an autonomous driving vehicle according to claim 1, wherein the information provided by the information provision device includes text information.

7. The control system for an autonomous driving vehicle according to claim 1, wherein the information provided by the information provision device includes image information.

8. The control system for an autonomous driving vehicle according to claim 1, wherein the information provided by the information provision device includes voice information.

9. The control system for an autonomous driving vehicle according to claim 1, wherein the information provision device is a display device configured to display at least one of text information and image information as the information provided by the information provision device.

10. The control system for an autonomous driving vehicle according to claim 1, wherein the information provision device is a speaker configured to emit voice information as the information provided by the information provision device.

11. A control method of an autonomous driving vehicle comprising an information provision device configured to provide a driver with information,
    the control method including an operation request step of controlling the information provision device to provide the driver with information during autonomous driving to thereby request a predetermined operation to the driver,
    the operation request step including:
        a margin time calculation step of calculating a margin time until a timing at which the driver should start the operation when the operation should be requested to the driver; and
        an information provision control step of controlling the information provision device to:
            provide the driver with information differing according to the margin time to thereby request the predetermined operation to the driver,
            provide the driver with operation information, which is information on the operation, and additional information different from the operation information when the margin time is longer than a predetermined threshold time, and
            provide the driver with the operation information without providing the driver with the additional information when the margin time is shorter than the threshold time.

12. The control method for an autonomous driving vehicle according to claim 11, wherein the information provision device is a display device configured to display at least one of text information and image information as the information provided by the information provision device.

13. The control method for an autonomous driving vehicle according to claim 11, wherein the information provision device is a speaker configured to emit voice information as the information provided by the information provision device.

* * * * *